Sept. 15, 1925.   1,553,620
C. A. KERKLING ET AL
NONSKID MECHANISM
Filed Dec. 14, 1920

Inventors
Clarence A. Kerkling
Joseph L. Dougty

Patented Sept. 15, 1925.

1,553,620

UNITED STATES PATENT OFFICE.

CLARENCE A. KERKLING AND JOSEPH L. DAYTON, OF DENVER, COLORADO, ASSIGNORS, BY DIRECT AND MESNE ASSIGNMENTS, TO THE UNITED STATES CHAIN CO., OF DENVER, COLORADO, A TRUST ASSOCIATION.

NONSKID MECHANISM.

Application filed December 14, 1920. Serial No. 430,631.

*To all whom it may concern:*

Be it known that we, CLARENCE A. KERKLING and JOSEPH L. DAYTON, citizens of the United States, residing in the city and county of Denver and State of Colorado, have invented certain new and useful Improvements in Nonskid Mechanism; and we do declare the following to be a full, clear, and exact description of the invention, such as will enable others skilled in the art to which it appertains to make and use the same, reference being had to the accompanying drawings, and to the characters of reference marked thereon, which form a part of this specification.

The object of this invention is to provide a non-skid device for use on automobile tires which is highly efficient, long-lived and as a result relatively cheap in the end.

The invention resides primarily in the cross bands which go across the tire, and comprises a plurality of short bars or links pivotally connected in transverse and longitudinal series. At least the greater part of said bars or links are provided with projections for insuring a firm grip on the road. Means are provided at the ends of each cross band for attachment to annular chains at the sides of the wheel by which the bands are positioned.

Figure 1:
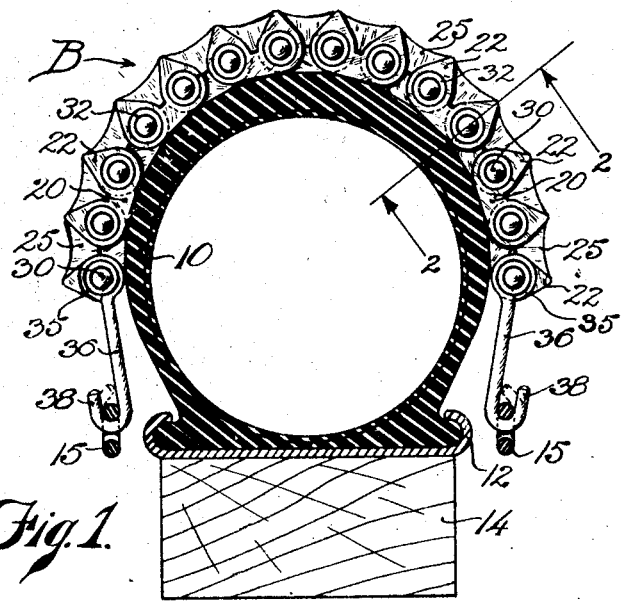
Fig. 1 is a cross section through a tire showing a side elevation of a cross band in position.
Figure 2:
Fig. 2 is a transverse section through a band at a pivot taken on line 2—2 of Fig. 1.

The usual tire 10, rim 12 and felly 14 are shown, at the sides of which are the conventional positioning or mounting chains 15.

The links or bars 20 are short as shown and are provided at their ends with projections or studs 22 and holes 24 for receiving pivoting bolts or rivets 26 having at one end heads 28 and at the other end retaining washers 32 which bear against shoulders 34 to prevent binding of the bars 20 when the elements are assembled and the rivets headed as at 30.

Figure 5:
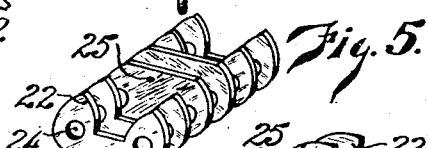
Fig. 5 is a similar view of the adjacent series.
Figure 4:
Fig. 4 is a perspective showing some of the bars or links of a transverse series removed from the pivots and extended.
Figure 6:
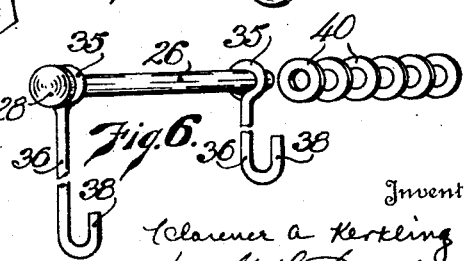
Fig. 6 is a perspective view of one of the end pivots with the attaching hooks in place and the spacing washers removed.

To assist traction, certain of the bars or links 25 may have flat road-engaging edges flush with the projections 22. These bars 25 will preferably be in pairs on alternate transverse series as in Fig. 5 and singly on intermediate transverse series as in Fig. 4, thus producing staggered relation of said bars 25 longitudinally of the band B. The edges of these bars may be perfectly straight as in Figs. 4 and 5, or slightly irregular or curved as in Fig. 1.

The rivet 26 at each end of each non-skid band B, has the eye 35 of an attaching hook 36 secured at each extremity. Each hooked extremity 38 of the hooks 36 is adapted to be engaged in the links of the side chains 15, and if desired the hooks 38 may then be closed to form eyes and maintain secure engagement as indicated in dotted lines in Fig. 1. In order to properly space the links or bars 20 on the end rivets 26, spacing washers 40 are provided to lie between adjacent bars.

Figure 7:
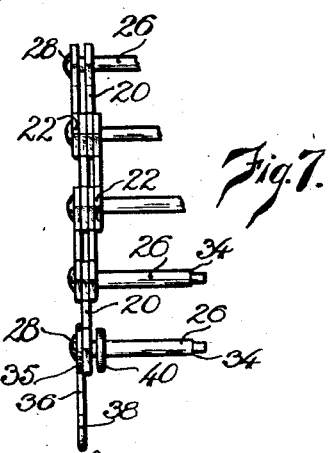
Fig. 7 is a plan showing but a few of the elements of a cross band.
Figure 3:
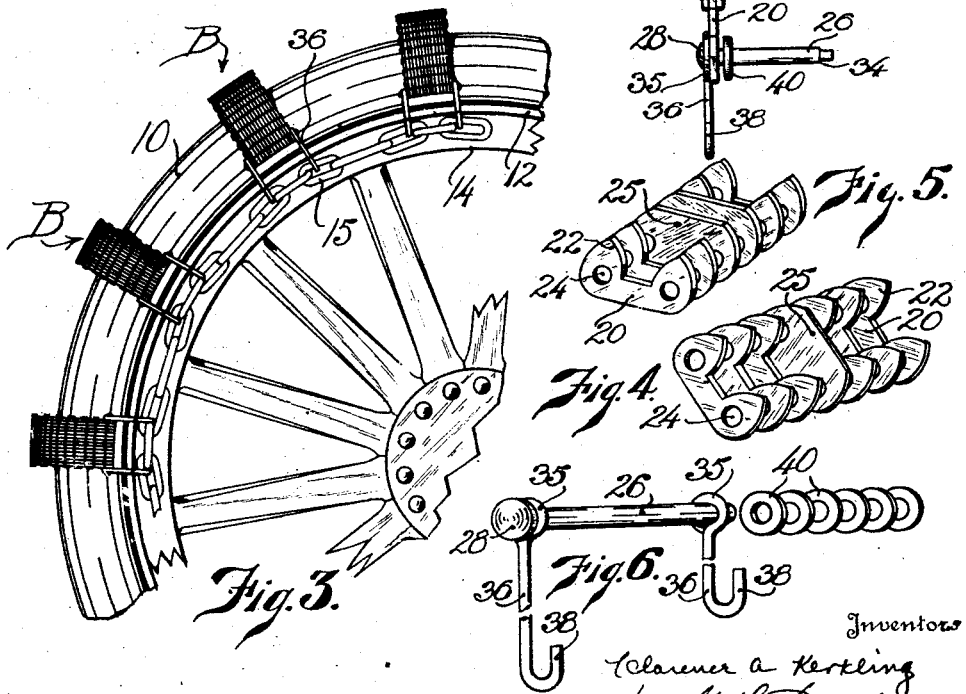
Fig. 3 is an elevation showing a number of bands in position on a wheel.

From the foregoing it will be seen that a hinged joint is provided at each rivet 26 thereby making each band B flexible. At the same time the projections 22 and the bars 25 insure a firm grip on the road, and extend sufficiently outward from the joints at 26 to insure long wear. The staggered relation of the bars in longitudinal series, and their spaced relation in transverse series is clearly indicated by the fragment in Fig. 7.

As is shown in the drawings, the bars 20 are all alike in construction and the projections 22 of adjacent series are alined transversely, so that transverse rows of projections are formed which are equidistantly spaced. In each of these rows the alined projections are contiguous, thus reinforcing one another and making the row substantially solid transversely so as better to resist wear and injury.

We claim:

1. A non-skid cross band for tires comprising a plurality of pivotally connected bars arranged in transverse series and having projections alined transversely, and a traction link interposed in certain of said series and of the length of the bars thereof and having its outer edge substantially flush with the tips of the projections and extending from end to end.

2. A non-skid cross band for tires comprising a plurality of pivotally connected bars arranged in transverse series, each bar having a plurality of projections, the projections of one transverse series being alined with the projections of adjacent transverse series forming spaced transverse rows of projections, and a traction link interposed in certain of said series and of the length of the bars thereof and having its outer edge substantially flush with the tips of the projections and extending from end to end of the link.

3. A non-skid cross band for tires comprising a plurality of short bars pivotally connected in transverse and longitudinal series, each bar having a plurality of projections, the projections of one transverse series being alined transversely with the projections of adjacent transverse series to form transverse rows, the projections in each row being contiguous and making the row substantially solid.

4. A non-skid cross band for tires comprising a plurality of short bars pivotally connected in transverse series and having projections, the projections of one transverse series being transversely alined with the projections of adjacent transverse series forming spaced, transverse rows, the projections in each row being contiguous thereby making the row substantially solid transversely.

5. A non-skid cross band for tires comprising a plurality of connected bars arranged in transverse series, each bar having a plurality of projections, the projections being alined transversely to provide spaced rows, and a traction link interposed in the series and of the length of the bars thereof and having its outer edge substantially flush with the tips of the projections and extending from end to end of the link.

In testimony whereof we affix our signatures.

CLARENCE A. KERKLING.
JOSEPH L. DAYTON.